United States Patent Office 3,232,677
Patented Feb. 1, 1966

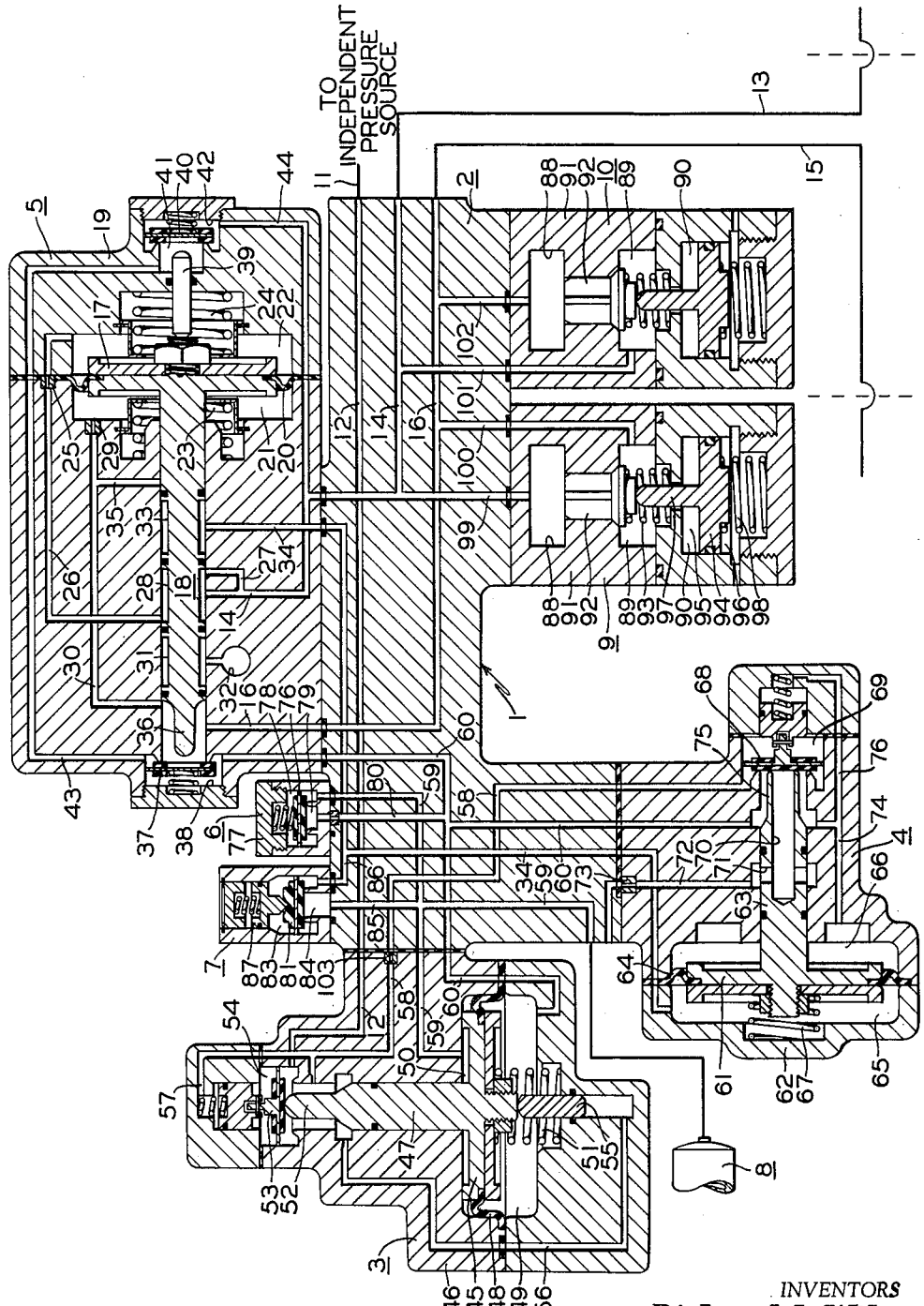

3,232,677
FLUID PRESSURE BRAKE CONTROL
APPARATUS
Richard L. Wilson, Trafford, and Richard W. Donovan, Pittsburgh, Pa., assignors to Westinghouse Air Brake Company, Wilmerding, Pa., a corporation of Pennsylvania
Filed May 22, 1964, Ser. No. 369,529
10 Claims. (Cl. 303—66)

This invention relates generally to a fluid pressure brake control apparatus, and relates more particularly to a repeater apparatus for reducing the over-all train brake pipe pressure gradient and includes an independent fluid pressure source disposed at mid-train and controlled by a relay valve device for reproducing at the rear portion of the train controlled variations in brake pipe pressures initiated in the front part of the train and, conversely, wherein said relay will transmit to the front portion of the train controlled pressure variations initiated at the rear portion of the train.

Heretofore, in copending application Serial No. 315,-479 (DAB Case 6191), now Patent No. 3,180,695, filed October 11, 1963, and assigned to the same assignee as the present invention, there is proposed a simple, effective relay device for controlling a separate source of fluid pressure disposed in mid-train for controlling the brake pipe pressure in the rear portion of the train, thus maintaining the overall brake pipe pressure gradient at a reduced value. The independent source of pressure is controlled by a simplified double-acting relay valve device responsive to brake pipe pressure changes in the front of the train to relay the same to the rear part o fthe train, and vice versa, the independent source disposed at mid-train effecting a lower over-all brake pipe pressure gradient extending from the front portion of the train to the rear portion of the train, and vice versa. In this apparatus, a duplication of valve mechanism is required for each end of the train.

It is an object of the present invention to provide in a relay device of the type generally described above, a relaying or repeating mechanism having a greater sensitivity to relative changes in fluid pressure between the section of brake pipe connected to the brake valve and fluid pressure source at the front of the train, and the section of brake pipe connected to the rear of the train as mainly supplied by the independent source at mid-train as controlled by the relay mechanism, requiring only one set of valve mechanisms which serves both ends of the train.

In the present invention, the repeater apparatus comprises a pipe bracket on which is mounted a positioning or selector valve device, a repeater or relay valve device, a cut-off valve device, a check valve device, a two-step check valve device, and a pair of by-pass valve devices. An independent source of fluid pressure and a reservoir or volume are connected to the aforementioned valve devices. When the entire assembly is connected between the front brake pipe leading to the front of the train and the rear brake pipe leading to the rear of the train, the selector valve device responds to the predominant pressure between the front and rear brake pipes connected thereto to selectively open one or the other of two supply valves to establish the pressurized one of the pipes as the front brake pipe, and to establish the other brake pipe at the opposite end of the train as the rear brake pipe to receive the fluid pressure from the independent supply. The cut-off valve device responds to the predominant pressure between the rear brake pipe and the volume charged to equal front brake pipe pressure to open or close associated check valve devices connecting the independent fluid supply to one side of a check valve associated with the repeater valve device. The repeater valve device operates from a normally lapped position to either open said associated check valve in response to a preponderance of pressure in the front brake pipe over that in the rear brake pipe to connect the independent supply to charge the volume through a third check valve and at the same time charge the rear brake pipe by way of the selector valve, or, in response to a preponderance of pressure in the rear brake pipe, produced by a service rate reduction in the front brake pipe, to connect the rear pipe to exhaust. The service rate reduction in the front brake pipe blows down the volume through the two-step check valve for minimizing pressure differential across the cut-off valve device to maintain the cut-off valve device in the position to hold its associated check valve in the open condition so that the independent supply is continuously maintained at the associated check valve of the relay valve device for immediate action in the event leakage should require a pipe pressure balancing operation by the relay valve device. In the event of a service rate reduction in the rear brake pipe, the cut-off relay valve device responds to the preponderance of pressure in the charged volume over the rear brake pipe pressure to close the supply valve to cut off supply to the rear of the train, in which event the rear brake pipe pressure provides a sufficient differential across the by-pass valve to open same for connecting the front brake pipe directly to the rear brake pipe to reduce the pressure in the front brake pipe to effect a service rate reduction. An emergency reduction in either brake pipe effects operation of the by-pass valves to effect direct connection between the pipes.

These and other objects will become more apparent when taken in conjunction with the following description and in conjunction with the drawing, in which the single figure of the drawing is a schematic view of a brake control apparatus showing the present invention.

Referring now to the drawing, there is shown the repeater apparatus, generally indicated at 1, as intended for installation on a special utility car carrying an independent source of fluid pressure (not shown), the car to be disposed substantially at the middle of a long freight train and connected to the brake pipes leading to the front and rear portions of the train.

The repeater apparatus 1 generally comprises a pipe bracket 2 having disposed thereon a cut-off valve device generally indicated at 3, a relay valve device generally indicated at 4, a selector valve device generally indicated at 5, a volume discharge check valve device generally indicated at 6, a two-step check valve generally indicated at 7, a volume or reservoir generally indicated at 8, and a pair of by-pass check valve devices generally indicated at 9 and 10, each of which elements and its relationship to the others is hereinafter described in detail.

At the right-hand side of the drawing are shown the pipe connections which communicate the repeater apparatus 1 with the independent pressure source (not shown) and the remainder of the train system (not shown). Specifically, an independent source pipe 11 is provided for connecting the passage 12 in the bracket 2 to a compressor supplied reservoir (not shown) which supplies the repeater apparatus 1 through a pressure regulating feed valve (not shown). A first brake pipe section 13 is provided for connecting the passage 14 in the bracket 2 to the brake pipe in the first portion of the train. A second brake pipe segment 15 is provided for connecting passage 16 in the bracket 2 to the second portion of the train. As hereinafter described, the brake pipes 13 and 15 may be interchanged for connection to either the front or rear portions of the train without changing the operation of the apparatus. Consequently, the utility car bearing the repeater apparatus may be oriented oppositely in a train without interfering with the operating of the repeater apparatus.

The selector valve device 5 operates in response to whichever one of the brake pipes 13 or 15 are utilized as the front brake pipe connected to the locomotive for charging the brake mechanisms on the train from a zero pressure condition to select the non-charging brake pipe as the rear brake pipe to be supplied by the independent source on the utility car. This selection is maintained until a zero pressure condition again exists in the charging brake pipe. The selector valve device 5 comprises a piston 17 connected to a piston valve 18, each disposed in a suitable cavity in a casing 19 mounted on the pipe bracket 2. A diaphragm 20 is clamped at its outer edge between sections of casing 19 and is suitably attached to piston 17 to divide the piston cavity into two chambers 21 and 22. A pair of caged springs 23 and 24 are disposed in chambers 21 and 22, respectively, to return the piston 17 to its neutral position, as shown, under zero pressure conditions in the chambers 21, 22. Chamber 22 communicates with the piston valve bore by way of a choke valve 25 and passage 26 which is normally communicated across the bore with passage 14 and its branch passage 27 by way of a reduced neck portion 28 on the piston valve 18. The chamber 21 communicates with the piston bore by way of a choke 29 and a passage 30 which normally communicates across the bore around the end of piston valve 18 with passage 16 and brake pipe 15. When the piston valve 18 is moved to the left from the normal position shown, in response to the application of initial charging pressure in brake pipe 13, from the locomotive at that end of the train, the pressure is transmitted through passage 14, neck portion 28, passage 26 and choke 25 to chamber 22, a reduced neck portion 31 on piston valve 18 communicates passage 30 with an exhaust passage 32, thus communicating chamber 21 with exhaust 32. At the same time, in response to the aforementioned leftward movement of the piston valve 18, a neck portion 33 on piston valve 18 is disposed adjacent branch passage 27 of main passage 14 for communicating the same with a passage 34 leading to the relay or repeater valve device 4, as hereinafter described. Conversely, when charging pressure is applied first to brake pipe 15, rather than to brake pipe 13, as by a helper locomotive on the opposite end of the train, the pressure charge is transmitted through passage 16, around the end of piston valve 18, through passage 30 and choke 29 to provide pressure in chamber 21 effecting a rightward movement of piston valve 18 to communicate exhaust 32 by way of neck portion 31 with passage 26, choke 29 and chamber 21. At the same time, the rightward movement of piston valve 18 communicates branch passage 35 of passage 30 by way of neck portion 33 of piston valve 18 with the previously-described passage 34 to control the relay valve device 4.

From the foregoing, it is apparent that whichever one of the brake pipes 13 or 15 provides the initial charging, pressure is connected by operation of the selector valve 5 to passage 34, thus characterizing passage 34 as the front fluid passage, that is, the passage connected to the locomotive end of the train. The left end of piston valve 18 is provided with a pusher stem 36 for moving leftward with piston valve 18 to engage and unseat a spring-biased check valve 37 normally effecting a separation between the end of the piston valve bore and a chamber 38, so that pressure in chamber 38 provided through operation of relay valve device 4 and cut-off valve device 3, in a manner hereinafter described, may be communicated with passage 16 and brake pipe 15 in response to a leftward movement of piston valve 1, as above described in response to pressure provided in front brake pipe 13. The right end of piston valve 18 is provided with a pusher stem 39 for moving rightward with piston valve 18 to engage and unseat a spring-biased check valve 40 normally effecting a separation between a pair of chambers 41, 42, so that pressure in previously-described chamber 38, associated with check valve 37, provided through operation of relay valve 4 and cut-off valve device 3 may be transferred through passage 43 to chambers 41, 42 and branch pipe 44 to pipe 14 and brake pipe 13 in response to a rightward movement of piston valve 18, as above described in response to initial application of pressure in rear brake pipe 15 rather than in front brake pipe 13.

The cut-off valve device 3 operates to normally communicate the independent source on the utility car with the relay valve device 4, so that the latter may control pressure from the independent source to the rear portion of the train during all normal brake pipe pressure changes on the front end of the train, and, conversely, operates in response to service pressure changes applied from the rear of the train to cut off the independent source to the relay valve device 4 and to the rear brake pipe. The cut-off valve device 3 comprises a piston 45 disposed in a cavity in a casing 46 and having attached thereto a stem 47 movable in a suitable bore. A diaphragm 48 is attached to piston 45 and has its outer edge fixed between sections of casing 46 to divide the cavity into two chambers 49 and 50. A spring 51 disposed in chamber 49 biases the piston 45 in its uppermost position, as shown. The upper end of stem 47 is provided with a pusher pin 52 adapted to engage and unseat a check valve 53 biased to close the end of the piston bore to separate the same from a chamber 54 communicating with the hereinbeforementioned passage 12 to receive fluid pressure as provided by independent source pipe 11. The piston 45 is pressure balanced for sensitivity by means of a pusher stem 55 disposed in a bore in the lower wall of chamber 49, and bears upwardly against piston 45 under pressure provided through a passage 56 communicating the upper end of the stem bore with the bore of pusher stem 55. The check valve 53 is pressure balanced for sensitivity by means of a branch passage 57 of passage 58, the former communicating the upper side of check valve 53 with the upper end of the piston bore, and the latter communicating the upper end of the piston bore with the relay valve device 4, as hereinafter described. The chamber 50 is subject to the pressure supplied by reservoir 8 through a passage 59 extending therebetween, the reservoir or volume 8 being chargeable by the cooperative operation of the cut-off value device 3 and the relay valve device 4, in a manner hereinafter described in detail. The chamber 49 is subject to pressure in whichever one of the brake pipes 13 and 15 is characterized as the rear brake pipe by operation of the selector valve device 5, as provided by the operation of relay valve device 4 which communicates the independent source pressure thereto through passage 60, as hereinafter described in detail. The independent source pipe 11 is communicated by way of passage 12 with the chamber 54, so that in response to a preponderance of pressure in chamber 49 over that in chamber 50, check valve 53 is unseated to provide source pressure through chamber 54 and passage 58 to the relay valve device 4.

The relay valve device 4 operates in a first mode to communicate the front of the train, that is, the locomotive end, with the independent source to charge the brake pipe at the rear end of the train, and operates in response to a reduction in brake pipe pressure at the front end of the train in a second mode to cut off the supply of pressure from the independent source to the rear of the train, and to further vent the rear brake pipe to provide a reduction therein corresponding to the service reduction in the front brake pipe of a train. The relay valve device 4 comprises a piston 61 disposed in a cavity in a casing 62 and having attached thereto for movement therewith a piston stem valve 63 movable in a suitable stem bore. A diaphragm member 64 is suitably attached to the piston 61 and has its outer end suitably clamped between sections of casing 62, thus dividing the cavity into a pair of chambers 65, 66. A spring 67 disposed in chamber 65 biases the piston 61 to the right slightly beyond a lap position. A check valve 68 is disposed in a chamber 69 and is normally biased to separate chamber 69 from the piston valve bore. When the piston valve stem 63 moves to the right from the lap position shown, check valve 68 is unseated to communicate the stem bore with chamber 69. The stem 63 includes a bore 70 having a passage 71 communicating bore 70 with the piston bore so that when the stem 63 is moved to the left from the lap position shown, the end of a stem bore is communicated by way of bore 70 and passage 71 to a passage 72 and a choke 73 to atmosphere, the choke 73 controlling venting of the passage 60 at a service rate. At the same time, the chamber 66 is communicated to atmosphere by a passage 74 also communicating with the stem bore and bore 70 in stem 63. The distal end of stem 63 is necked at 75 to provide a space between the stem 63 and its bore, which space is communicated with chamber 49 in the previously-described cut-off valve device 3 by way of passage 60 to supply pressure thereto, in a manner hereinafter described in the operation of the valve device 1. A branch passage 76 of passage 74 communicates the stem bore with the upper side of check valve 68 to provide pressure balancing thereof for sensitivity.

The volume charging check valve device 6 is disposed between the relay valve device 4 on one side thereof and the cut-off valve device 3 and volume 8 on the other side thereof to permit controlled charging of the volume 8 and the cut-off valve device 3, and thereafter effect a supply cut-off operation of valve device 3 to the rear of the train in response to a pressure differential between the front brake pipe and the rear brake pipe instituted from the rear of the train, and to maintain the cut-off valve device 3 in this cut-off operating position after an emergency pressure reduction instituted from the rear of the train. The check valve device 6 comprises a valve member 76 disposed in a casing 77 and is spring biased to separate chambers 78 and 79, the latter being communicated with relay valve device 4 by way of a choke and a branch passage 80 of passage 60, and the former being communicated with chamber 50 of cut-off valve device 3 and with the volume 59 by previously-described passage 59.

The two-step check valve device 7 is disposed between the front fluid pressure passage 34 on one side thereof and the volume 8 and chamber 50 of the cut-off valve device 3 on the other side thereof, and operates to retain some pressure in volume 8 and chamber 50 at low front brake pipe pressures and to release pressure from the volume 8 and chamber 50 in response to front brake pipe reduction during a brake application instituted from the front of the train to hold the check valve 53 in the cut-off valve device 3 in the open position to supply independent source pressure to the relay valve device 4. The double or two-step check valve 7 comprises a check valve 81 disposed in a casing 82 to separate a pair of chambers 83 and 84, the latter communicated with volume 8 by way of branch passage 85 of passage 59, and the former communicated with front fluid pressure passage 34 by way of a branch passage 86 of passage 34. A spring-biased piston 87 is disposed in chamber 83 to hold check valve 81 in seating separation between chambers 83 and 84, and is subject to a predetermined positive pressure in chamber 83, as provided by front brake pipe pressure in passage 34, to disengage the check valve 81, allowing the latter to be independently responsive to pressure in volume 8 and chamber 50 of cut-off valve device 3 when a pressure reduction occurs in the front fluid passage 34 to thus blow down volume 8 and chamber 50 accordingly, so that the cut-off device 3 will be thereafter immediately operative to open check valve 53 to supply pressure to valve device 4.

The by-pass check valve device 9 is disposed between brake pipe 13 and brake pipe 15 in bypass of the remainder of the apparatus to provide communication therebetween when the pressure in brake pipe 13 exceeds that of brake pipe 15 by a predetermined amount, for example, 2 p.s.i., as would occur when a service application is instituted at the caboose end of a train through pipe 15, but only when this differential occurs above pressures in both brake pipes of a given relatively larger amount, such as 15 to 20 p.s.i., so that the by-pass valve will remain inoperative until the selector valve device 5 has operated to connect the brake pipes to the remainder of the apparatus 1. By-pass check valve 9 comprises three axially spaced cavities 88, 89 and 90 disposed in a casing 91. A flute valve 92 is disposed in a bore connecting cavities 88 and 89, and is biased to seat in cavity 89 by a spring 93 disposed in cavity 89. A piston 94 is disposed in cavity 90 and divides the same into a pair of chambers 95 and 96 and includes a stem 97 extending through a passage connecting cavity 89 with cavity 90 for engagement with flute valve 92. A spring 98 is disposed in chamber 96 to bias the piston upwardly into engagement with flute valve 92, as shown. Branch passage 99 of passage 14 communicates from the brake pipe 13 with chamber 89. Branch pipe 100 communicates with passage 16 and connects brake pipe 15 to chamber 89 so that when chamber 89 receives a predetermined pressure of about 20 p.s.i. during charging thereof, piston 94 lowers to unload flute valve 92 to permit opening of flute valve 92 in response to a service rate reduction exceeding 2 p.s.i. in brake pipe 15 to communicate brake pipe 13 with rear brake pipe 15.

The by-pass valve device 10 is identical to valve device 9, and, accordingly, no further description is necessary, corresponding parts therein having the same reference numerals as those of by-pass valve device 9, above described. By-pass valve 10 is connected to passages 14 and 16 in opposite relationship to that described above with respect to by-pass valve 9, that is, branch pipe 101 communicates cavity 89 with passage 14, while branch passage 102 communicates cavity 88 with passage 16.

In the operation of the repeater apparatus now to be described in detail, it will be assumed that brake pipe 13 is connected to the front portion of the train, that is, the locomotive end, that brake pipe 15 is connected to the rear portion of the train, and that pipe 11 is connected to the independent source, such as a compressor fluid supply, through a feed valve set to provide normal brake pipe pressure and carried by the utility car disposed between the front and rear portions of the train. It will initially be assumed that the brake pipe pressure on both ends of the train is at zero, and that it is intended to charge the brake pipe from the front end of the train where the brake valve has been moved to the release position to provide brake pipe 13 with fluid under pressure to charge the same. Before pressure is applied to brake pipe 13, all valve devices are in the position shown in the drawing. It is to be particularly noted that stem 47 of the cut-off valve device is biased to its upper position to hold check valve 53 open, thus already providing fluid at feed valve pressure from pipe 11, through passage 12, chamber 54 of the check valve 53, passage 58, and choke 103 to chamber 69 of the check valve 68 in relay valve device 4. The supply of fluid under pressure to brake pipe 13, as provided by the brake valve on the front of the train, enters passage 14 to selector valve 5 where it passes neck portion 28 of piston valve 18, enters passage 26 and chamber 22 through choke 25, whereupon piston 17 and piston valve 18 move to the left to communicate chamber 21 to exhaust 32 via choke 29, passage 30 and neck portion 31 of piston valve 18, and also to connect passage 14 and branch pipe 27 to provide fluid pressure to passage 34 via neck portion 33 of piston valve 18. The selector device 5 will then remain in this position until the pressure in chamber 22 is reduced to zero by a reduction to zero pressure in brake pipe 13. It is to be observed that if brake pipe 15 were connected to the locomotive end of the train, rather than brake pipe 13, the selector valve device 5 would have moved to the right, connecting brake pipe 15 to passage 34, thus, passage 34 is established as the front fluid pressure passage regardless of which of the brake pipes 13 or 15 are connected to the locomotive.

The front brake pipe pressure, as provided in passage 34 by the selector valve device 5, as above described, is transmitted by passage 34 to chamber 65 of relay valve device 4, and, secondly, is transmitted via branch passage 86 of passage 34 to chamber 83 of two-step check valve device 7. In the two-step check valve 7, the pressure builds up to 10 p.s.i., whereupon piston 87 moves upwardly to release spring-biased pressure upon check valve member 81. In relay valve device 4, the pressure in chamber 65 provided by passage 34 effects movement of stem 63 to the right to unseat check valve 68, thus allowing independent source pressure already in chamber 69 to proceed into the stem bore to passage 74 and chamber 66, and, secondly, to proceed from the stem bore 70 to passage 60 at a rate which is a compromise between a rate large enough to maintain brake pipe pressure on the rear of the train against heavy leakage and a rate small enough which will permit caboose valve brake applications in a train having minimum leakage, which compromise rate is determined by choke 103.

The pressure provided in passage 60 from operation of the relay valve device 4, as above described, proceeds first to chamber 49 of cut-off valve device 3 to hold the piston 45 upward and to hold check valve 53 open, second, to branch passage 80 through check valve 76 and passage 59 to chamber 50 of cut-off valve 3 and to the volume 8, and, thirdly, through branch passage 85 of passage 59 to chamber 84 of check valve 81 which remains closed because of the previously-described pressure in chamber 83 thereof as provided by front fluid passage 34, and, lastly, through chamber 38 and open check valve 37 in the selector valve 5 to passage 16 and rear brake pipe 15 to charge the rear portion of the train. It is to be noted that inasmuch as passage 34 is characterized as the front fluid pressure passage, that is, the passage connected to the brake pipe charging end of the train, by operation of the selector valve, as above described, by the same token, operation of the selector valve device 5 connects the other non-charging brake pipe to passage 60 by opening either one of the supply valves 37 or 40, thus characterizing passage 60 as the rear fluid pressure passage, that is, the passage connected to the non-charging or caboose end of the train.

In the relay valve device 4, when the pressure in chamber 66, as provided by the independent source through cut-off valve device 3, as above described, builds to be slightly greater than that in chamber 65 as provided by the pressure in the fornt fluid pressure passage 34, stem 63 moves leftward to the lap position shown, thus closing the check valve 68. Depending upon the leakage rate in the rear brake pipe 69, check valve 68 may be held slightly open to provide continuous fluid flow to the rear passage 60. Under these conditions, in the cut-off valve 3, the pressure in chamber 49 equals rear brake pipe pressure, and the pressure in chamber 50 and volume 8 also equals rear brake pipe pressure. In the two-step check valve 7, piston 87 is in the raised position, thus unloading check valve member 81, the pressures being now equal in chambers 84 and 83, the former corresponding to rear brake pipe pressure and the latter corresponding to front brake pipe pressure.

In by-pass valve device 9, piston 94 holds flute valve 92 in the position shown to prevent communication between passages 14 and 16 until pressure in passage 16 builds up to a predetermined pressure of about 15–20 p.s.i., thus providing sufficient pressure to operate selector valve device 5, whereafter piston 94 moves downwardly to unload flute valve 92.

In the event a brake application is made from the front end of a train, thus effecting a pressure reduction in brake pipe 13, this reduction will register first in chamber 83 of the two-step check valve 7 through passages 86, 34, 14 and brake pipe 13, and, second, in the relay valve device 4 through passage 14, neck portion 33 in the selector valve 5, front fluid pressure passage 34 into chamber 65, whereupon the predominant pressure in chamber 66 will effect a leftward movement of piston 61 and stem 63 to communicate bore 70 in stem 63 to atmosphere via passages 71 and 72 and choke 73 to thus first exhaust chamber 66 of relay valve device 4 at a service rate through passage 74 and the bore 70 in stem 63, second, to exhaust chamber 49 in the cut-off valve device 3 through rear fluid pressure passage 60 and the bore 70 in stem 63, and, third, to exhaust rear brake pipe 15 through passage 16, open check valve 37 and rear fluid pressure passage 60. When the pressure in chamber 66 in relay valve device 4 reduces to equal the pressure in chamber 65, relay valve device 4 will lap off to the position shown to close off bore 70 in stem 63 from exhaust and to maintain the equivalently reduced pressure in chamber 50 of cut-off valve device 3. Because of the previously-described reduction in pressure in chamber 83 in the check valve 7, check valve member 81 will open under the predominant pressure in chamber 84 as provided thereto by chamber 50 in the cut-off valve device 3 and volume 8, whereupon chamber 50 and volume 8 will blow down until the pressure therein equals that now prevailing in the front fluid pressure passage 34. It is seen, therefore, that the pressures in chambers 49 and 50 of the cut-off valve device 3 reduce equally at substantially the same rate in response to a brake application from the front of the train to thus hold the cut-off check valve 53 in the open position to continue providing independent source pressure through passage 58, choke 103 to chamber 69 in check valve 68 of the relay valve 4, to maintain the relay valve 4 effective to maintain brake pipe pressure in the rear of the train in the event of leakage during a service application.

A brake release operation, after the service application, is effected by charging the front brake pipe 13 to position the various valve devices, in the manner previously described above.

In the event of a service brake application made from the rear of the train, in this example, brake pipe 15, the pressure reduction in the brake pipe 15 is transmitted through passage 16, check valve 37 in the selector valve 5 to rear fluid pressure passage 60. The reduction in pressure in passage 60 is transmitted first to branch passage 80 and chamber 79 of check valve 6 to hold the check valve closed and thus render the pressure reduction ineffective to blow down volume 8 and chamber 50 of the cut-off valve device 3, second, to the stem bore of relay valve 4 and passage 74 to reduce pressure in chamber 66, effecting a rightward movement of piston 61 and stem 63 to open check valve 68 which normally would provide pressure from the independent source to the rear pipe, and, third, to reduce pressure in chamber 49 of cut-off valve device 3 at a faster rate than choke 103 is providing supply flow to relay device 4, thus effecting downward movement of piston 45 and stem 47 thereof to close check valve 53, and thus cut off the independent source of supply to chamber 69 of the check valve 68 in the relay valve device 4, thus counteracting the opening operation of check valve 68 in the relay valve device 4 and preventing the independent source of supply from providing pressure to the rear fluid pressure passage 60 and brake pipe 15. When the reduction of pressure in brake pipe 15 exceeds that in brake pipe 13 by 2 p.s.i., the flute valve 92 in by-pass valve device 9 moves downward under the preponderance of pressure in cavity 88 and branch passage 99 of passage 14 over that in cavity 89, branch passage 100 of passage 16 to directly communicate passage 14 to passage 16 and reduce the pressure in the front brake pipe 13, which pressure reduction registers as an increase in flow in the front brake pipe supply at the brake valve to indicate to the engineer that a brake application has been made at the rear portion of the train, and that he should either move his brake valve to the lap position to enable continuance of the brake pipe reduction, or that he should apply the brakes to stop the train.

An emergency brake application at either end of the train is transmitted across the relay valve device 4 and the cut-off valve device 3 by way of either of by-pass check valves 9 and 10, in the manner described above.

When the brake pipe pressure is vented to atmosphere by reason of an emergency brake application, the piston 17 in selector valve device 5 will be neutralized by equal pressure in chambers 21 and 22 and will assume the neutral position, as shown, under the urging of neutralizing springs 23 and 24, whereafter it will again be responsive to an initial pressure increase in either brake pipe 13 or brake pipe 15 to select the opposite end of the train as the rear portion.

Having now described the invention, what we claim as new and desire to secure by Letters Patent, is:

1. Apparatus for varying the pressure in one brake pipe in part of a train in accordance with the pressure variations in an other brake pipe in the remaining part of said train, and vice versa, comprising:
   (a) relay means responsive to a preponderance of pressure in said other brake pipe over that in said one brake pipe to effect charging of said one brake pipe by an independent pressure source to a pressure equaling that in said other brake pipe, and operable in repsonse to a pressure reduction in said other brake pipe relative to that in said one brake pipe to vent said one brake pipe to equalize the pressure therein with that in said other brake pipe,
   (b) means including cut-off means operable in response to a pressure reduction in said one brake pipe relative to that in said other brake pipe to prevent said relay means from effecting said charging of said one brake pipe, and
   (c) means responsive to a pressure reduction in said one brake pipe relative to the pressure in said other brake pipe to connect said one brake pipe to said other brake pipe in bypass of said relay means and said cut-off means.

2. Apparatus for varying the pressure in the brake pipe in one part of a train in accordance with variations in an other brake pipe in the remaining part of said train, and vice versa, comprising:
   (a) selector means adapted for connection between said one brake pipe and said other brake pipe, said means being operable in response to whichever one of said one brake pipe and said other brake pipe is initially charged from zero pressure to connect the same to a front fluid passage and to connect the uncharged one of said one brake pipe and said other brake pipe to a rear fluid passage,
   (b) relay means responsive to a preponderance of pressure in said front fluid passage over that in said rear fluid passage to effect charging of said rear fluid passage by an independent pressure source to a pressure equivalent to that in said front fluid passage, and operable in response to a pressure reduction in said front fluid passage relative to the pressure in said rear fluid passage to vent said rear fluid passage to reduce the pressure therein to that of said front pressure passage,
   (c) means including cut-off means operable in response to a pressure reduction in said rear fluid passage relative to the pressure in said front fluid passage to prevent said relay means from effecting charging of said rear fluid passage, and
   (d) means responsive to a pressure reduction in whichever one of said one brake pipe and said other brake pipe is connected to said rear fluid passage to connect thereto the other of said one brake pipe and said other brake pipe in bypass of said relay means and said cut-off means.

3. The apparatus, as recited in claim 1, and further characterized in that said means including cut-off means comprises:
   (a) check valve means disposed between said independent source and said relay means,
   (b) means responsive to a preponderance of pressure or an equal pressure in a first chamber relative to a second chamber to open said check valve means, and responsive to a predominant pressure in said second chamber relative to said first chamber to close said check valve to cut off source of fluid from said relay means, said first chamber adapted for connection to said one pipe,
   (c) a second check valve disposed between said one pipe and said second chamber and adapted to open for charging said chamber in response to a predominant pressure in said one pipe,
   (d) a volume connected to said second chamber, and
   (e) a third check valve disposed between said other pipe on one side thereof and said second chamber and said volume on the other side thereof to vent said volume and said second chamber only when pressure in said other pipe is less than that in said one pipe.

4. The apparatus, recited in claim 2, in which said means including cut-off means comprises:
   (a) a first check valve means disposed between said independent source and said relay means,
   (b) means responsive to a preponderance of pressure or an equal pressure in a first chamber relative to a second chamber to open said check valve means, and responsive to a predominant pressure in said second chamber relative to said first chamber to close said check valve means, said first chamber being connected to said rear fluid passage,
   (c) a second check valve disposed between said rear fluid passage and said second chamber to open for charging said chamber in response to a preponderant pressure in said rear fluid passage,
   (d) a volume connected to said second chamber, and
   (e) a third check valve disposed between said front fluid passage on one side thereof and said second chamber and said volume on the other side thereof to vent said volume and said second chamber only when pressure in said front fluid passage is less than that in said volume to said second chamber.

5. Apparatus for varying the pressure in the brake pipe in one part of a train in accordance with the pressure variations in another brake pipe in the remaining part of a train, and vice versa, comprising:
   (a) front passage means adapted for connection to said other brake pipe,
   (b) rear passage means adapted for connetion to said one brake pipe,
   (c) supply passage means adapted for connection to an independent source of fluid pressure,
   (d) first valve means operable to an open position to communicate said supply passage means to a first passage means,
   (e) second valve means operable to an open position to communicate said first passage means with said rear passage means,
   (f) means responsive to a preponderance of pressure or an equal pressure in a first chamber relative to a second chamber to open said first valve means, and operable in response to a preponderance of pressure in said second chamber relative to said first chamber to close said first valve means, said first chamber communicating with said rear passage means, (g) a volume communicating with said second chamber, (h) a third valve means communicating on one side thereof with said rear passage means and communicating on the other side thereof with said second chamber and said volume and operable to effect charging of said volume and said second chamber in response to preponderance of pressure in said rear passage means, and operable to prevent discharge of said volume and said second chamber in response to a preponderance of pressure in said volume and said second chamber relative to the pressure in said rear passage means, (i) a fourth valve means communicating one one side thereof with said front pressure passage and communicating on the other side thereof with said volume and said second chamber to communicate said other side with said one side in response to a preponderance of pressure in said volume and said second chamber relative to said front pressure passage, (j) means responsive to a preponderance of pressure in a third chamber communicating with said front passage means relative to a fourth chamber communicating with said rear passage means to open said second valve means, and operable in response to a preponderance of pressure in said fourth chamber relative to said third chamber to close said second valve means and communicate said rear passage means to atmosphere, and (k) means connected between said front passage means and said rear passage means for communicating said front passage means directly with said rear passage means in response to the establishment of a predetermined pressure differential in either of said front passage means and said rear passage means relative to the other occuring after said one pipe and said other pipe have been charged.

6. The apparatus recited in claim 5, and further including a selector means adapted for connection between said one brake pipe and said another brake pipe, said selector means being operable in response to whichever one of said one brake pipe and said other brake pipe is initially charged from zero pressure to communicate the same with said front passage means and to communicate the uncharged brake pipe of said one brake pipe and said other brake pipe to said rear passage means.

7. The apparatus recited in claim 5, and further characterized in that said fourth valve means comprises:
(a) a valve member disposed in a fifth chamber so that the predominant pressure in said front passage means seats said valve member to close off said front passage means, and
(b) a piston in said fifth chamber biased to engage and hold said valve member in seated position for maintaining a predetermined pressure in said volume and said second chamber and operable in response to a predetermined pressure in said front passage means to disengage from said valve member.

8. The apparatus recited in claim 2, and further characterized in that said selector means comprises:
(a) valve means responsive to a preponderance of pressure in a first chamber relative to that in a second chamber to communicate said other brake pipe with said front fluid passage and to communicate said one brake pipe with said rear fluid passage, and operable in response to a preponderance of pressure in said second chamber relative to said first chamber to communicate said other brake pipe with said rear fluid passage and to communicate said one brake pipe with said front fluid passage,
(b) means biasing said valve means to a neutral position when the pressure in said first and second chambers are equal, and
(c) means carried by said valve means for communicating said second chamber to atmosphere in response to the first said operation of said valve means, and operable to communicate said first chamber to atmosphere in response to the second said operation of said valve means.

9. The apparatus recited in claim 6, and further characterized in that said selector means comprises:
(a) fifth valve means operable in a first mode in response to a preponderance of pressure in a fifth chamber relative to that in a sixth chamber to communicate said other brake pipe with said front fluid passage and to communicate said one brake pipe with said rear fluid passage, and operable in a second mode in response to a preponderance of pressure in said sixth chamber relative to said fifth chamber to communicate said other brake pipe with said rear fluid passage and to communicate said one brake pipe with said front fluid passage,
(b) means biasing said fifth valve means to a neutral position when the pressure in said fifth and sixth chambers are equal, and
(c) means carried by said fifth valve means for communicating said sixth chamber to atmosphere in response to the first said mode of operation of said fifth valve means, and operable to communicate said fifth chamber to atmosphere in response to the second said mode of operation of said fifth valve means.

10. Apparatus for varying the pressure in one brake pipe in part of a train in accordance with the pressure variations in an other brake pipe in the remaining part of said train, and vice versa, comprising:
(a) relay means responsive to a preponderance of pressure in said other brake pipe over that in said one brake pipe to effect charging of said one brake pipe by an independent pressure source to a pressure equaling that in said other brake pipe, and operable in response to a pressure reduction in said other brake pipe relative to that in said one brake pipe to vent said one brake pipe to equalize the pressure therein with that in said other brake pipe,
(b) means including cut-off means operable in response to a pressure reduction in said one brake pipe relative to that in said other brake pipe to prevent said relay means from effecting said charging of said one brake pipe, and
(c) means responsive to a pressure reduction in either of said one brake pipe or said other brake pipe relative to the other one of said one brake pipe or said other brake pipe to connect said one brake pipe to said other brake pipe in bypass of said relay means and said cut-off means.

References Cited by the Examiner
UNITED STATES PATENTS 1,845,492  2/1932  Farmer _____ 303—10
1,969,812  8/1934  McCune _____ 303—82

EUGENE G. BOTZ, *Primary Examiner.*